United States Patent [19]
Kind

[11] Patent Number: 5,275,818
[45] Date of Patent: Jan. 4, 1994

[54] APPARATUS EMPLOYING QUESTION AND ANSWER GRID ARRANGEMENT AND METHOD

[76] Inventor: Uwe Kind, 400 E. 59th St., New York, N.Y. 10022

[21] Appl. No.: 833,752

[22] Filed: Feb. 11, 1992

[51] Int. Cl.⁵ ............................................. G09B 19/08
[52] U.S. Cl. ........................................ 434/157; 2/115
[58] Field of Search ....................... 434/157, 156, 112; 2/115; 40/586

[56] References Cited

U.S. PATENT DOCUMENTS

| | | | |
|---|---|---|---|
| 3,724,102 | 4/1973 | Van Patten | 434/157 |
| 4,597,055 | 6/1986 | Hashimoto | 434/157 X |
| 5,121,505 | 6/1992 | Ludmer et al. | 2/113 X |

FOREIGN PATENT DOCUMENTS

| | | | |
|---|---|---|---|
| 0037270 | 10/1981 | European Pat. Off. | 434/156 |
| 0068935 | 1/1983 | European Pat. Off. | 434/157 |
| 2459518 | 2/1981 | France | 434/157 |
| 0464582 | 12/1968 | Switzerland | 434/157 |

OTHER PUBLICATIONS
Washington Post, Parade Section, Jul. 6, 1975, "New Vocabulary Gimmick".

*Primary Examiner*—Gene Mancene
*Assistant Examiner*—Jeffrey A. Smith
*Attorney, Agent, or Firm*—Arthur L. Plevy

[57] ABSTRACT

A communication apparatus enabling a person speaking a native language to communicate with a person who speaks a foreign language or target language. The communication apparatus includes graphic symbols depicting objects which are commonly understood in both the native language and the target language, and text in both the native language and the target language, which is used in conjunction with the graphic symbols. The native language text includes phonetic spellings of the phrases which were translated into the target language. The communication apparatus is applied to any article which is worn, carried or used by persons speaking the native language. The native language text may be inverted so that it is viewable by the wearer of a garment upon which the present invention is applied. Communication is accomplished by selectively pointing to different areas in the grid containing the text and graphic symbols, and by simultaneously pronouncing the phonetic spellings of the phrases.

17 Claims, 9 Drawing Sheets

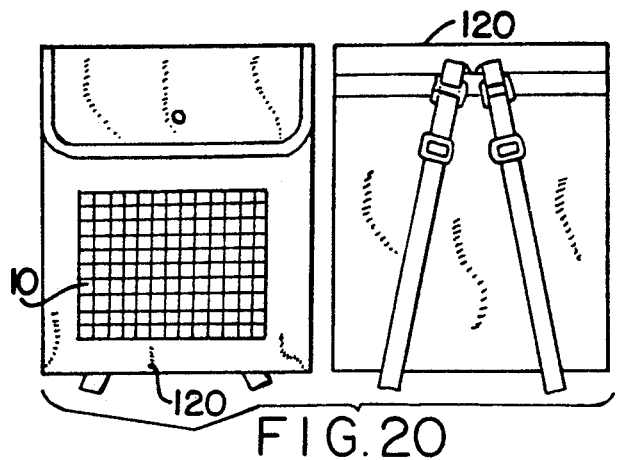
FIG. 20
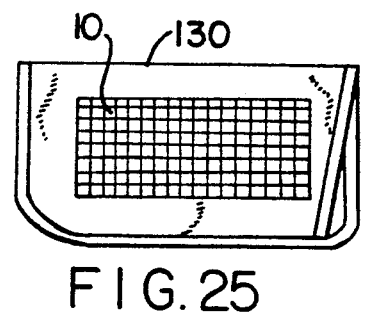
FIG. 25
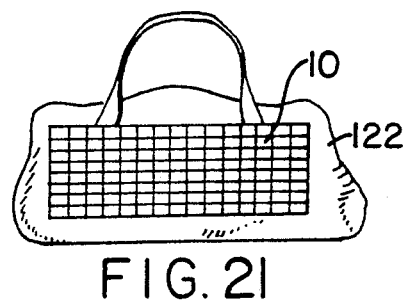
FIG. 21
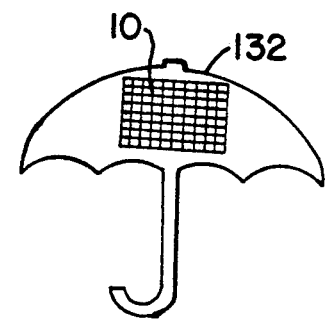
FIG. 26
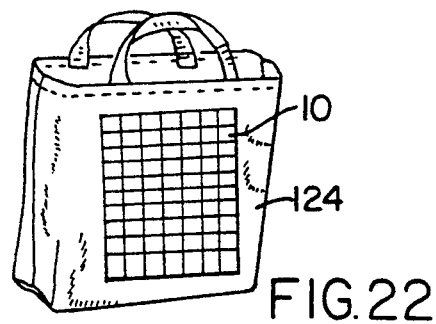
FIG. 22
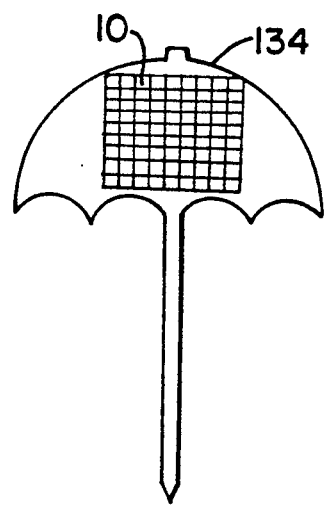
FIG. 27
FIG. 23
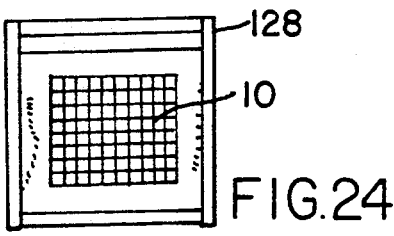
FIG. 24

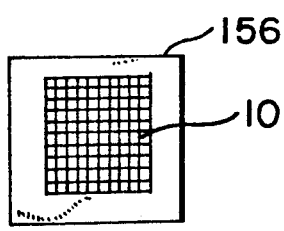
FIG. 38
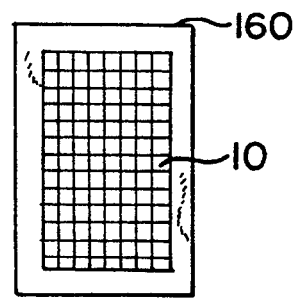
FIG. 40
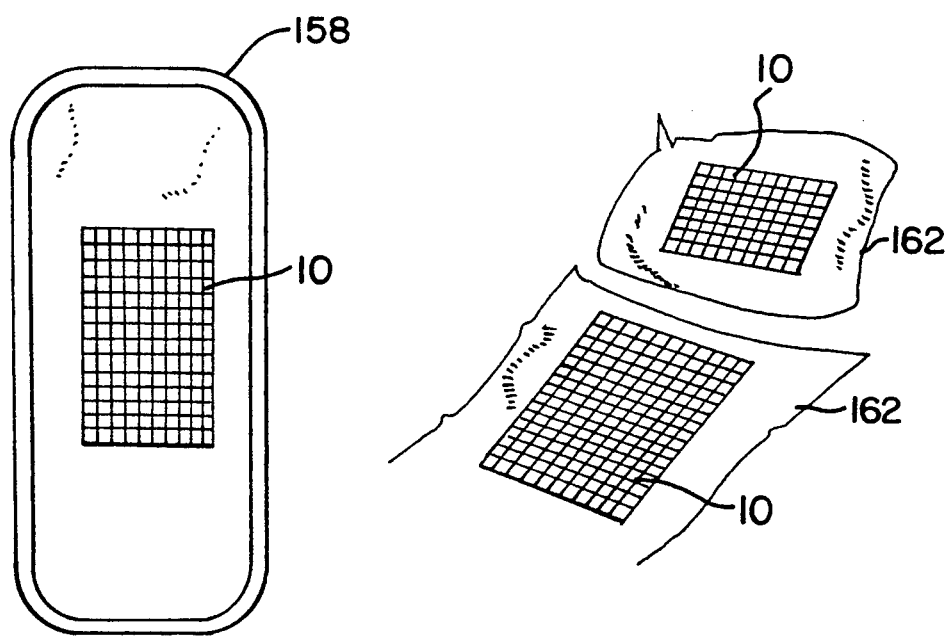
FIG. 39
FIG. 41

APPARATUS EMPLOYING QUESTION AND ANSWER GRID ARRANGEMENT AND METHOD

FIELD OF THE INVENTION

The present invention relates to an apparatus that enables communication between people who do not speak the same language, and more particularly to a grid arrangement of indicia including internationally recognizable symbols employed to enable such communication in both a native and a foreign language.

BACKGROUND OF THE INVENTION

The need to communicate quickly and easily with others who do not speak the same language is a common problem for tourists, new immigrants, foreign exchange students and the like. Basic communication skills are essential for such visitors in order to interact with others who speak the native language. For instance, a person who speaks a foreign language must be able to ask basic questions such as how much something costs, ask directions or ask for help in the native language in order to function efficiently within the society.

It is therefore an object of the present invention to set forth an apparatus for rapidly forming common questions, answers, and statements in a desired foreign language by referencing certain textual phrases and internationally recognizable symbols printed on a common surface.

SUMMARY OF THE INVENTION

The present invention is a communication apparatus that enables a person who speaks a native language to communicate with a person who speaks a foreign or target language. The communication apparatus includes graphic symbols depicting objects which are commonly understood in the native language country and the target language country. The communication apparatus also includes text in the native language and corresponding target language. Such text includes terms of etiquette so that a visitor may politely communicate with a person speaking a target language. The text also includes words and phrases used to inquire about, request or otherwise identify the graphic symbols. Included in the text is a phonetic spelling of the target language translation of words or phrases printed in native language text.

The communication apparatus also includes various numbers presented in the native language and target language. The numbers can be referenced to identify quantities, distances, sums of money or the like.

The communication apparatus may be applied to any common surface as long as the text and graphics are understandable to a reader. An efficient application of the communication apparatus is to affix the apparatus to common articles which may be conventionally worn, carried or used by a visitor to a target country. In this way, the visitor will have a useful article, such as a shirt, totebag or mug, in combination with the communication apparatus. This aspect, therefore enables such articles to serve a dual purpose.

As mentioned, the communication apparatus may be applied to an article of clothing, such as a T-shirt, which will be worn by a visitor speaking a native language. When the communication apparatus is applied to the front of such clothing, it is useful to display the native language text and phonetic spellings in an inverted relationship to the target language text so that such text is readable from the perspective of the wearer. At the same time the target language text is readable from the perspective of a person facing the wearer.

Non-verbal communication between a person speaking a native language and a person speaking a target language can be accomplished by selectively pointing to various text, graphic symbols and numbers. Verbal communication can be accomplished by simultaneously pronouncing the phonetic spelling corresponding to the text selectively chosen.

BRIEF DESCRIPTION OF THE DRAWINGS

For a better understanding of the present invention, reference is made to the following description of an exemplary embodiment thereof, considered in conjunction with the accompanying drawings, in which:

FIGS. 20-27 show exemplary embodiments of the present invention wherein the question and answer grid is applied to common articles which are carried.

FIGS. 28-41 show exemplary embodiments of the present invention wherein the question and answer grid is applied to common objects.

DETAILED DESCRIPTION OF THE DRAWINGS

Figure 1:
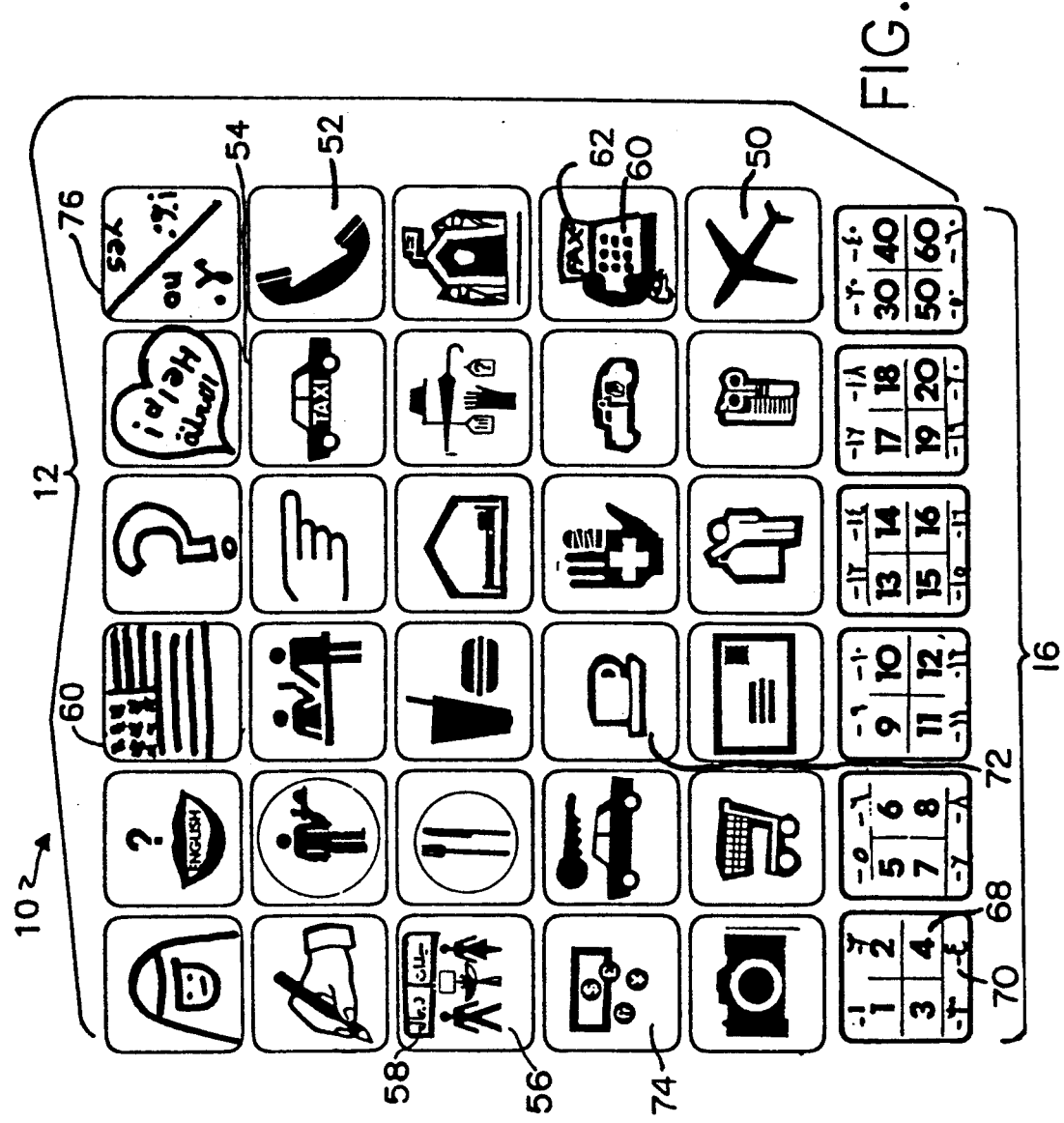
FIG. 1 is a front perspective view of a question and answer grid constructed in accordance with one exemplary embodiment of the present invention.
Figure 1:
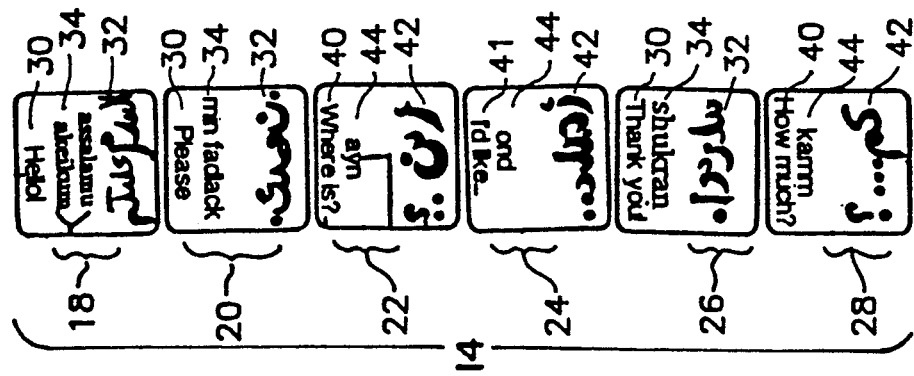

Referring to FIG. 1, there is shown one preferred embodiment of the present invention used to help a person fluent in English to communicate with a person fluent in Arabic. It will be understood that the choice of English and Arabic is arbitrary and any two languages may be used.

In FIG. 1, there is shown a grid or matrix 10 of individual cells arranged in a plurality of rows and columns. Contained within the matrix 10 is a first plurality of cells 12 containing graphic symbols, whereby the graphic symbols identify objects which are internationally recognizable. A second plurality of cells 14 that contain a variety of text are also included within the matrix 10, as are a third plurality of cells 16 that contain various numbers. The various cells contained within the matrix 10 can be arranged into any pattern and in any order, provided each of the cells are proximate one another on a common surface.

In the shown embodiment, the second plurality of cells 14 that contain text are arranged in a single column of the matrix 10, wherein the column is comprised of six cells 18, 20, 22, 24, 26, 28. In each of the six cells 18, 20, 22, 24, 26, 28 there is written a word or phrase in a native language (English), a translation of the word or phrase in a foreign or target language (Arabic) and a phonetic spelling of the translation in the native language. For reasons which will later be explained the word or phrase in the native language, as well as the phonetic spelling are printed in an inverted relationship to the target translation.

Some of the plurality of cells 14 that contain text, express terms of etiquette 30. For example, in the first text cell 18, the term of etiquette 30 expressed in English is "hello". Below "hello" is printed the Arabic target translation 32 of the word "hello" and juxtaposed between the English term of etiquette 30 and the target translation 32 is the phonetic spelling 34 of the target translation 32 in English. The second cell 20 and the fifth cell 26 also include terms of etiquette 30 such as "please" and "thank you". These terms of etiquette 30, are similarly matched with a corresponding target translation 32 and phonetic spelling 34 in English.

In the remaining cells 14 that contain text, interrogative phrases 40 and imperative phrases 41, that are commonly used to request, inquire about or otherwise identify objects are expressed in the native language. For example, in the third cell 22 the phrase "where is?" is printed. Similarly in the fourth cell 24 and sixth cell 28, the phrases "I'd like" and "how much?" are printed, respectively. Each of these cells also contain the target translation 42 of the interrogative phrases 40 and imperative phrases 41, as well as the phonetic spelling 44 of the target translation 42 in the native language.

It will be understood that the plurality of cells 14 that contain text may be any number and may contain terms of etiquette 30 or interrogative phrases 40 and imperative phrases 41 that are not shown in the illustrated embodiment. Regardless the number of cells 14, each word or phrase will be printed proximate a target translation of the word or phrase and a phonetic spelling of the target translation in the native language.

The plurality of cells 12 which contain graphic symbols, contain pictorial representations of objects that are recognizable to both a person fluent in a native language and a person fluent in a target language. The graphic symbols may be representative of places, services or objects about which a person typically would have reason to inquire. The graphic symbols are selected to represent essential objects needed in basic communication. For instance, the symbol for airport 50 may be included in the matrix 10, along with the symbols for telephone 52, taxi 54, rest rooms 56 and the image of the flag 60 of the country of origin of the person possessing the present invention. Many of the graphic symbols which are contained within the cells 12 represent objects that are commonly referenced using interrogative phrases 40 and imperative phrases 41 contained within the plurality of cells 14 that contain text. As such, many of the graphic symbols contained with the cells 12 can be used to complete expressions of thought using the interrogative phrases 40 and imperative phrases 41 contained within some cells 14 that contain text.

Certain graphic symbols may also contain text that augments a person's understanding of the graphic symbol. For example, rest room symbol 56 depicts figures of a man and a woman. Above each figure is text 58, written in the target language, which translates into "men's rest room" and "women's rest room". Similarly, the facsimile machine symbol 60, also contains text 62 of the word "fax".

The choice of graphic symbols which may be represented in the present invention is not limited to those symbols contained in the shown embodiment. Any commonly understood object or symbol representing a place or service about which a visitor would inquire may be used. Certain graphic symbols can be tailored toward a specific country being visited. For example, a question and answer grid useful to a visitor in Paris, France can contain graphic symbols representing the Eiffel Tower and the Louvre Museum. On the other hand, a question and answer grid useful to a visitor in New York City can contain symbols representing the Statue of Liberty, World Trade Center and the Empire State Building.

The plurality of cells 16 that contain various numbers is shown as part of the bottom row of matrix 10. In the cells 16 are printed numbers in the nomenclature 68 of the native language and the corresponding nomenclature 70 of the target language, whereby the target nomenclature 70 and the native nomenclature 68 are positioned proximate one another for the same number. In the shown embodiment, the nomenclature in both the native language and the target language is provided for numbers one through twenty and for the next four increments of ten.

Figure 2:
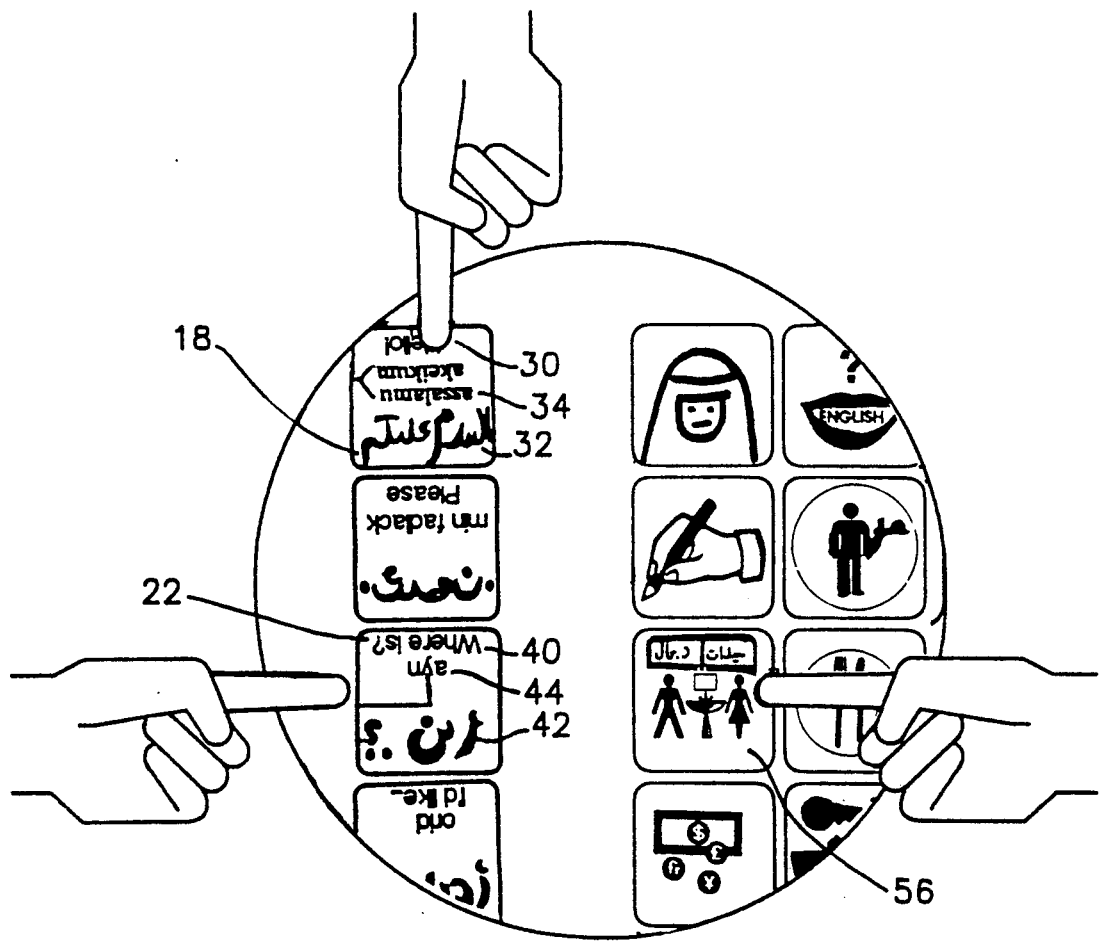
FIG. 2 shows a magnified section of the question and answer grid from FIG. 1 and illustrates how communication can be accomplished by pointing to different locations of the invention.

Referring to FIG. 2, a method for communicating using the present invention is illustrated, wherein a magnified view of a portion of matrix 10 is shown. Specific cells within the plurality of cells 14 that contain text and the plurality of cells 12 that contain graphic symbols are selectively referenced by a representation of a human hand.

Communication can be accomplished visually by sequentially pointing to individual cells in the matrix 10 to form complete expressions of thought. In FIG. 2, for example, a person who speaks English can generate the question "Hello", where is the restroom?" This is done by first pointing to a term of etiquette 30 contained in the plurality of cells 14 that contain text. Terms of etiquette 30 are used to politely begin and end a conversation. In this case, the English speaking person would begin the question by pointing to a cell 18 containing the word "Hello".

The person would next point to an interrogative phrase 40 or an imperative phrase 41, used in conjunction with objects which is also contained in the plurality of cells 14 that contain text. The interrogative phrases 40 and imperative phrases 41 used in conjunction with objects form the beginning inquiry or request of an expression which is to be communicated. The expression is then completed by pointing to one of the plurality of cells 14 which contain graphic symbols of objects which are recognizable in both the native and target language.

In the example presented in FIG. 2, the person points to an interrogative phrase 40 in the cell 22 containing the phrase "where is?", after pointing to the cell 18 containing the word "hello". Since the inquiry has been started by referencing the phrase "where is?", it must be completed by referencing one or more of the cells in the plurality of cells 14 containing graphic symbols. In this case, cell 56 containing the graphic symbol for restroom is selected.

Notice that each cell in the plurality of cells 14 containing text, contains either terms of etiquette 30 or interrogative phrases 40 and imperative phrases 41 used in conjunction with objects, which are written in English. Also contained in each cell are the target translations 32 in Arabic of the terms of etiquette 30 or the target translations 42 of the interrogative phrases 40 and imperative phrases 41. The person who speaks Arabic will read an Arabic translation at the same time each cell in the plurality of cells 14 containing text is referenced. Then, the person speaking English and the person speaking Arabic will understand the meaning of each graphic symbol as it is selected. In this way, communication between two individuals who do not speak the same language can be accomplished non-verbally.

The English speaking person can also communicate verbally with the Arabic individual by pronouncing the phonetic spelling 34 corresponding to the terms of etiquette 30 and the phonetic spelling 44 corresponding to the interrogative phrases 40 and imperative phrases 41 as each individual cell is chosen.

Another example of an expression which can be generated using the present exemplary embodiment of the invention is, "I'd like a cup of coffee please". In this case, the English speaking person can point to an imperative phrase 41 in the cell 24 containing "I'd like", found in the plurality of cells 14 containing text.

Next, the cell 72 containing a pictorial representation of a cup and saucer can be pointed to. This pictorial representation in cell 72 would have the implied meaning of "cup of coffee" in most societies. Finally, one of the terms of etiquette 30, "please" found in cell 20 can be pointed to, in order to politely complete the request. As with the previous example, the request may be communicated verbally by simultaneously pronouncing the corresponding phonetic spelling as cells are pointed.

In a final related example to that previously set forth, the English speaking person can inquire about cost by asking "How much money for the cup of coffee?" This question can be communicated by referencing the cell 28 containing "how much". Next the cell 74 containing a pictorial representation of money can be referenced. Finally, the cell 72 containing the cup and saucer may be referenced. This example illustrates that more than one cell from the plurality of cells 12 containing graphic symbols and the plurality of cells 14 containing text may be combined to communicate detailed expressions.

Responses to communicated questions can also be formulated by either communicating party using the present invention. For example, in response to the above inquiry regarding cost, the Arabic speaking person can answer by referencing one or more of the plurality of cells 16 that contain numbers, thus signifying the cost of an item. Other simple responses to questions can be generated by referencing the cell 76 containing "Yes" and "no" in both English and Arabic from the plurality of cells 12 containing graphic symbols.

Figure 5:
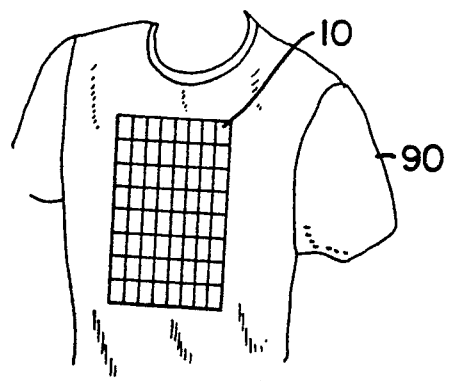
FIGS. 5-19 show exemplary embodiments of the present invention wherein the question and answer grid is applied to articles of clothing.
Figure 9:
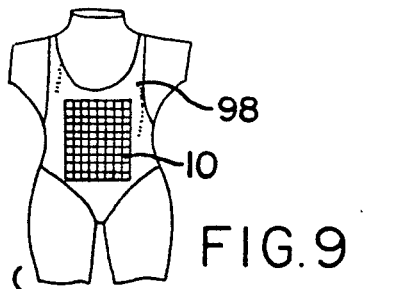
Figure 6:
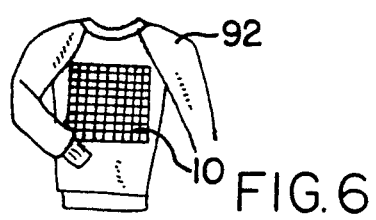
Figure 10:
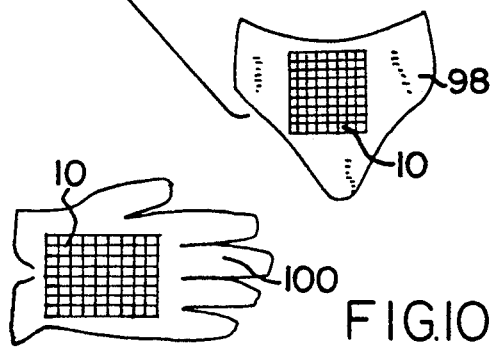
Figure 11:
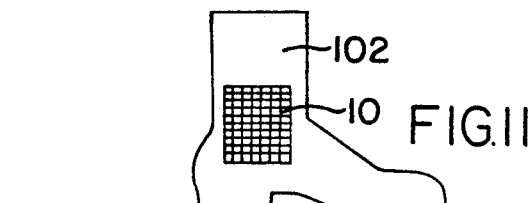
Figure 12:
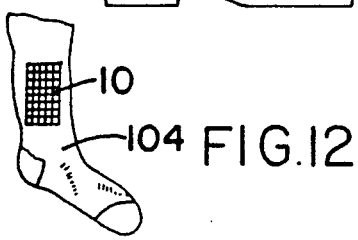
Figure 7:
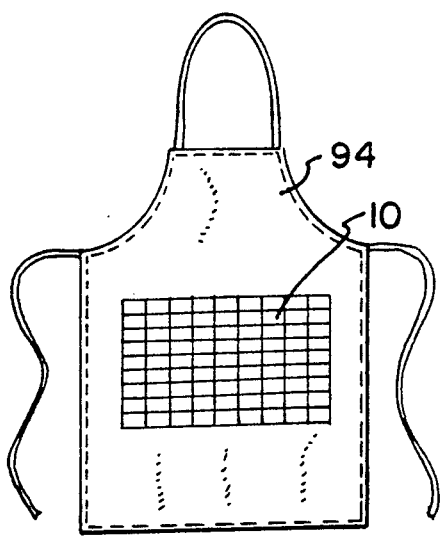
Figure 13:
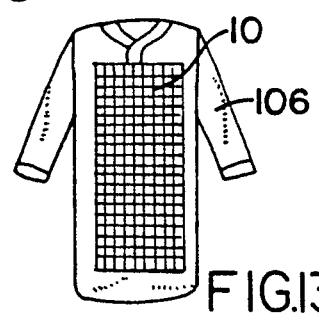
Figure 8:
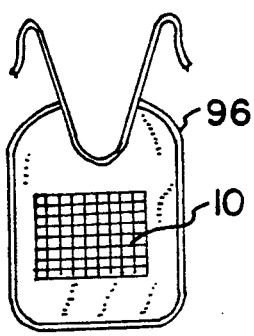
Figure 14:
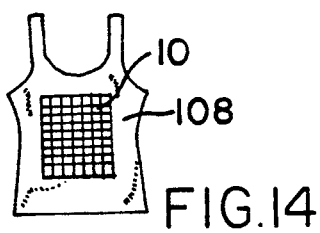
Figure 15:
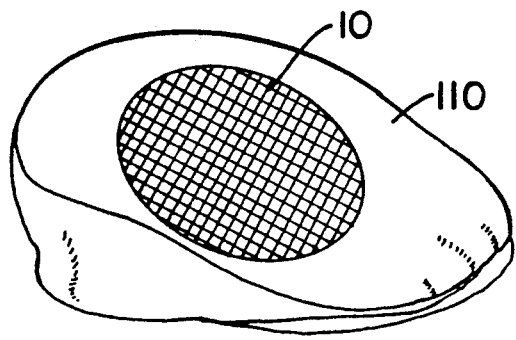
Figure 18:
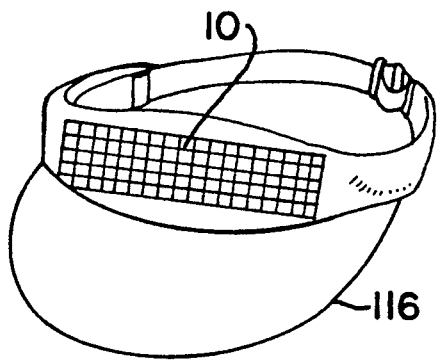
Figure 16:
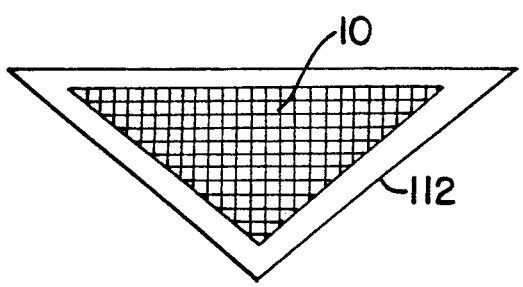
Figure 19:
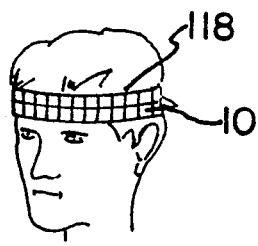
Figure 17:
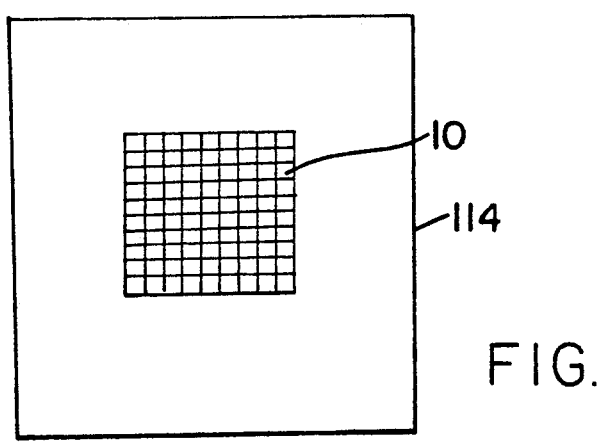
Figure 28:
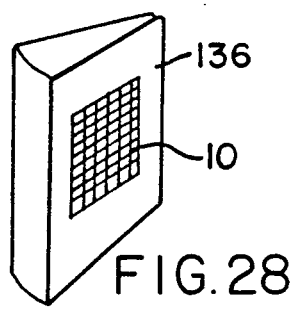
Figure 29:
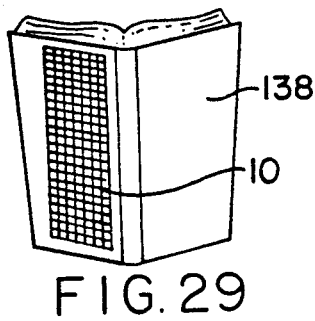
Figure 30:
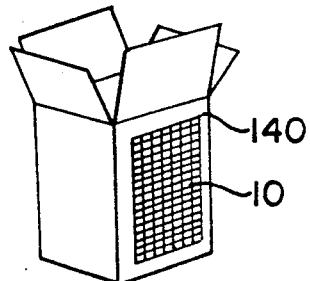
Figure 31:
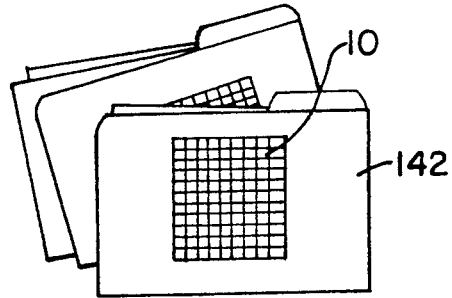
Figure 32:
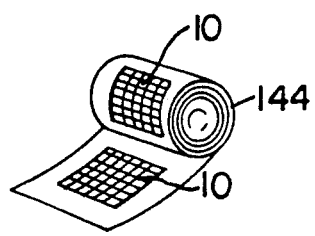
Figure 33:
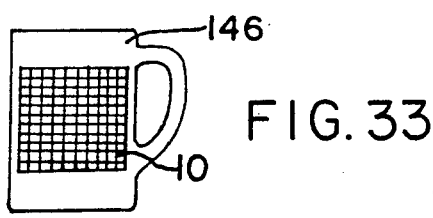
Figure 34:
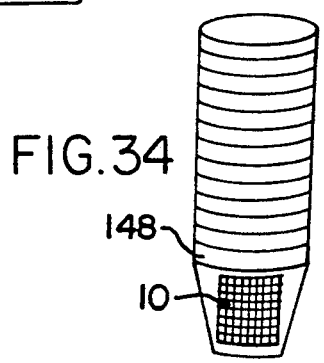
Figure 35:
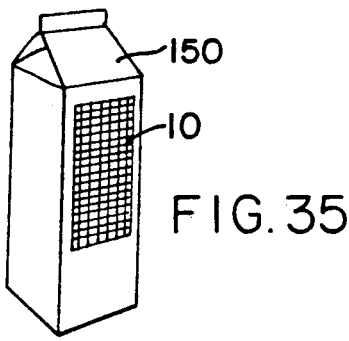
Figure 36:
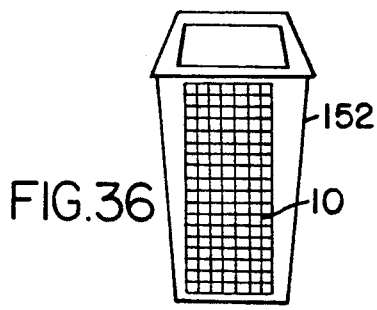
Figure 37:
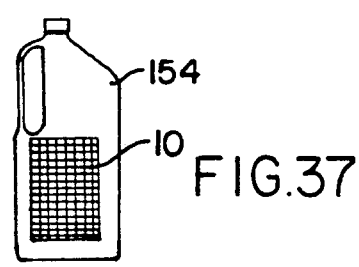

Embodiments of the present invention can be applied to any number of common surfaces, the only criterion being readability by two persons who wish to communicate. A particularly efficient employment of the present invention is to apply an embodiment to common articles which are worn, carried or used by visitors to a target country. Referring to FIG. 5, is shown one preferred embodiment for the present invention, wherein the matrix 10 is applied to the front of a T-shirt 90. Referring to FIGS. 6-19, are shown alternate embodiments of the present invention, in which the matrix 10 is applied to articles of clothing. Examples of articles of clothing to which the matrix 10 may be applied are: sweatshirt 92, apron 94, bib 96, swimsuit 98, gloves 100, boot 102, sock 104, nightshirt 106, tank top 108, cap 110, bandanna 112, scarf 114, visor 116 and headband 118.

Referring to FIGS. 20-27, are shown examples of items which are commonly carried by a visitor and to which the matrix 10 may be applied are: bookbag 120, sports bag 122, tote bag 124, carryall 126, wallet 128, purse 130, umbrella 132 and beach umbrella 134. Referring to FIGS. 28-41 are other examples of items used by a visitor to which the matrix 10 may be applied including: binder 136, book cover 138, box 140, folders 142, tape 144, mug 146, paper cups 148, carton 150, trash can 152, bottle 154, notecard 156, tray 158, towel 160 and bedding 162.

Referring again to the exemplary embodiment of FIG. 1, it was noted that the plurality of cells 14 containing text, contain words and phrases in the native language. These include terms of etiquette 30 and interrogative phrases 40 and imperative phrases 41 used in conjunction with objects and corresponding phonetic spellings 34 of the terms of etiquette 30 and phonetic spellings 44 of the interrogative phrases 40 and imperative phrases 41, which are printed in an inverted relationship to the target translation. Realizing that the exemplary embodiment may be applied to the front of articles of clothing worn by a visitor, the utility of such an arrangement of text becomes apparent. For example, when the exemplary embodiment is applied sufficiently low to the front of a T-shirt 90, the terms of etiquette 30, interrogative phrases 40 and imperative phrases 41 and corresponding phonetic spellings 34 of the terms of etiquette 30 and phonetic spellings 44 of the interrogative phrases 40 and imperative phrases 41, printed in the native language, are visible from a perspective of the wearer of the T-shirt 90. At the same time, the target language translations 32 of the terms of etiquette 30 and the target translations 42 of the interrogative phrases 40 and imperative phrases 41 would also be visible to another person speaking a target language who is facing the wearer of the T-shirt 90. Such an arrangement of text allows the wearer of the clothing, and the person speaking the target language, who is facing the wearer, the optimum readable views of the text which is displayed in this embodiment.

It is also understood that the terms of etiquette 30 and their corresponding phonetic spellings 34 and the interrogative phrases 40 and imperative phrases 41 and their corresponding phonetic spelling 44 may be printed in the same perspective as the target language translations 32 of the terms of etiquette 30 and the target language translations 42 of the interrogative phrases 40 and imperative phrases 41. This embodiment is useful when the two people wishing to communicate are viewing the invention from the same perspective.

A further exemplary embodiment of the present invention is to construct the matrix 10 so that individual cells in the plurality of cells 12 that contain graphic symbols, plurality of cells that contain text 14 and the plurality of cells 16 containing numbers are of a raised text so that the contents of the individual cells can be understood by a blind person. Blind visitors to a country where their native language is not spoken have the same communication needs as any other traveler. The exemplary embodiment described above facilitates communication between a blind person speaking a native language and another person speaking a target language.

Figure 3:
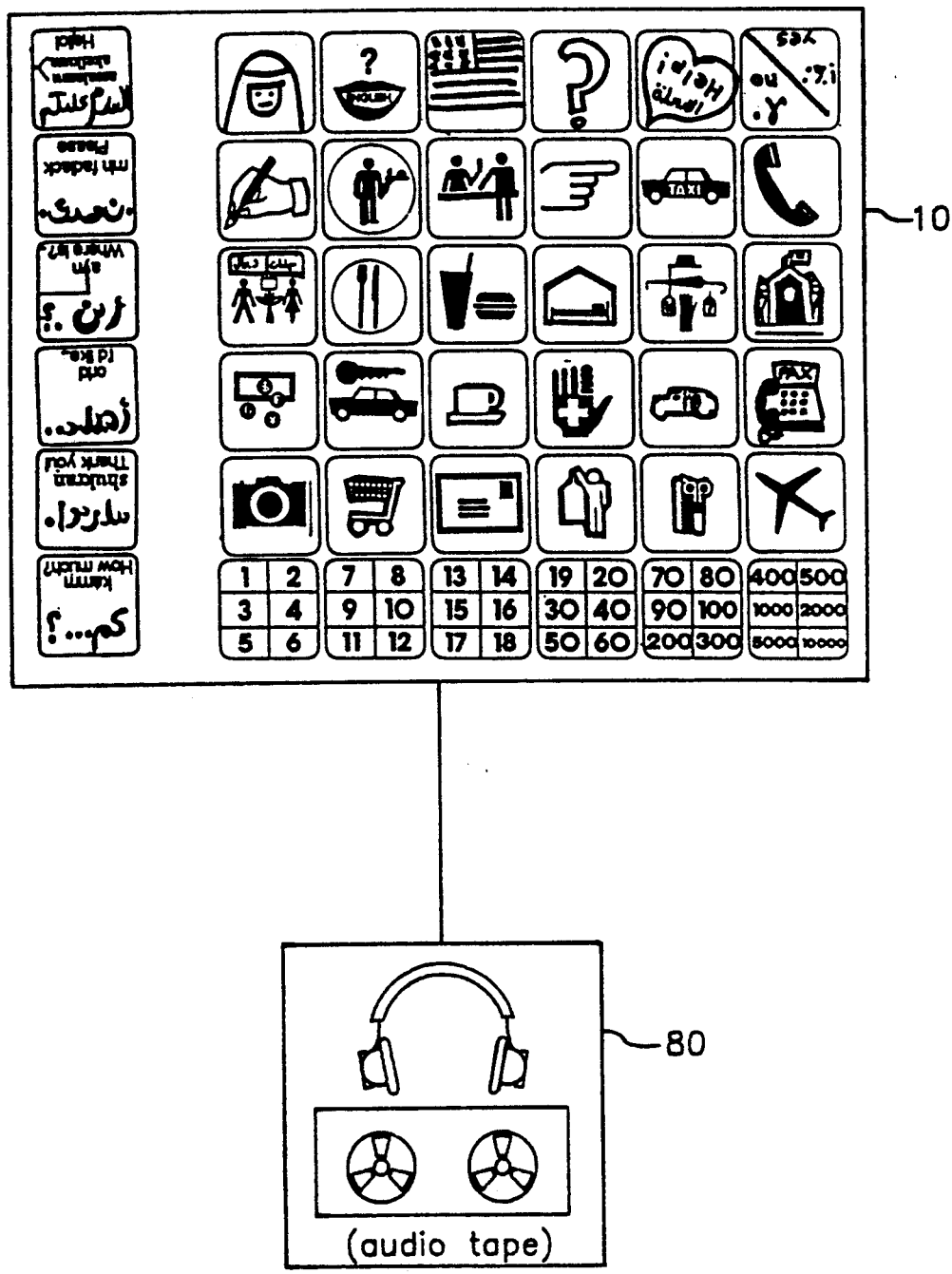
FIG. 3 shows a block diagram of one exemplary embodiment of the present invention coupled to an audio producing means.

Referring to FIG. 3, a block diagram of an exemplary embodiment of the present invention is shown wherein the matrix 10 is applied to a common surface and is coupled to an audio means capable of producing audio in a target language. The audio means 80 can be any apparatus capable of reproducing audio, such as an audio tape or a compact disc. Individual cells in the matrix 10, which are part of the plurality of cells 14 containing text, the plurality of cells 12 containing graphic symbols and the plurality of cells 16 containing numbers will serve as activating means to trigger the audio means 80 to reproduce selected portions of audio corresponding to the text or meaning of an individual cell when an individual cell is pressed. Technology contained in the audio means of the present invention, which allows selected portions of audio to be reproduced upon triggering is well known to a person skilled in the art.

Figure 4:
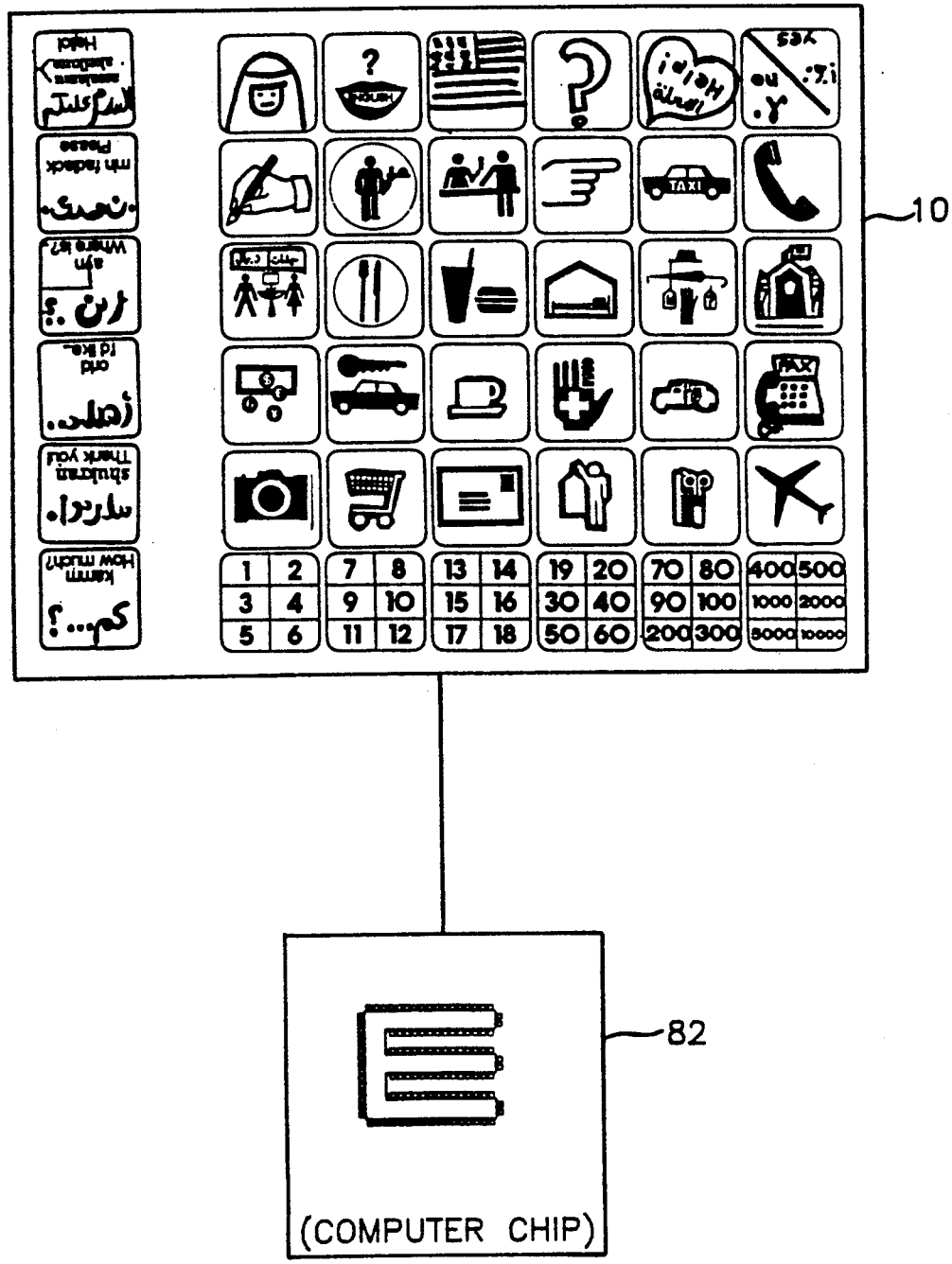
FIG. 4 shows a block diagram of one exemplary embodiment of the present invention coupled to an audio producing means which is a pressure sensitive memory chip.

Referring to FIG. 4, a block diagram of a further exemplary embodiment of the present invention is shown wherein individual cells of matrix 10 applied to a common surface are coupled to pressure sensitive memory chips 82 having a means to produce audio. Individual pressure sensitive memory chips 82 will have a means to produce audio in a target language which corresponds to the text or meaning of individual cells in the plurality of cells 14 containing text, the plurality of cells 12 containing graphics and the plurality of cells 16 containing numbers. Individual cells in the matrix 10 will serve as an activating means to trigger the pressure sensitive memory chips 82 to produce audio when an individual cell in the matrix is pressed. Technology pertaining to pressure sensitive memory chips 82 having a means to produce audio are known to a person skilled in the art. The inclusion of audio means in the present invention will enhance communication between two people who do not speak the same language, since a correct pronunciation in the target language will be reproduced by the audio means.

While exemplary embodiments of the present invention have been represented in the form of a matrix 10, it is understood that the text, graphic symbols and numbers presented in the invention may take on any arrangement desired. Also, as mentioned, it is understood that while the English and Arabic languages are shown in the exemplary embodiments, that any two languages may be represented. Finally, the invention is not limited to communication in foreign languages. An alternate embodiment of the present invention would contain text, graphic symbols and numbers which are understandable in a single language. Such an embodiment would allow persons, such as the deaf, to communicate non-verbally. Other uses for the invention include promoting products and services, and delivering information about health, safety and nutrition. In this case, it may be preferable for all text to be displayed in a single language.

I claim:

1. A communication apparatus for enabling a first user who speaks a native language to communicate with a second user who speaks a target language, said communication apparatus positioned on a common surface of an article which can be transported by at least one of said users in combination therewith, said communication apparatus comprising:

a plurality of graphic symbols depicting objects readily identifiable in said native language and said target language disposed on said common surface;

native language text corresponding to phrases commonly used in conjunction with said objects in said native language disposed on said common surface;

at least one target language text corresponding to a translation of said native language text into said target language, wherein said plurality of graphic symbols, said native language text and said target language text are disposed in a proximate relationship on said common surface, further including phonetic spellings of said target language text in said native language in order that said target language text may be correctly pronounced when referenced, said phonetic spellings disposed in a proximate relationship to said native language text, whereby said first person who speaks a native language and said second person who speaks a target language can communicate by sequentially referencing said native language text, said target language text and said graphic symbols to form a complete expression of thought.

2. The communication apparatus of claim 1, wherein said native language text and said phonetic spellings are disposed in an inverted relationship to said target language text in order that said native language text and said phonetic spellings may be readable from an opposite perspective from said target language text.

3. A communication apparatus for enabling a first user who speaks a native language to communicate with a second user who speaks a target language, said communication apparatus positioned on a common surface of an article which can be transported by at lest one of said users in combination therewith, said communication apparatus comprising:

a plurality of graphic symbols depicting objects readily identifiable in said native language and said target language disposed on said common surface;

native language text corresponding to phrases commonly used in conjunction with said objects in said native language disposed on said common surface;

at least one target language text corresponding to a translation of said native language text into said target language, wherein said plurality of graphic symbols, said native language text and said target language text are disposed in a proximate relationship on said common surface, wherein said native language text consists of commonly used interrogative and imperative phrases;

wherein said native language text, said target language text and said graphic symbols are arranged in a gridded geometric configuration containing horizontal rows from a first row to a last row and vertical columns from a first column to a last column; and wherein said first column is a command column containing said interrogative and imperative phrases in said native and said target language in order that said interrogative and imperative phrases may be quickly referenced and combined with said graphic symbols contained in a second column through said last column, whereby said first person who speaks a native language and said second person who speaks a target language can communicate by sequentially referencing said native language text, said target language text and said graphics symbols to form a complete expression of thought.

4. The communication apparatus of claim 3, wherein said plurality of graphic symbols, said native language text and said target language text are contained in a plurality of individual cells arranged in said gridded geometric configuration, whereby said first user who speaks a native language and said second user who speaks a target language can sequentially reference individual cells to form said complete expression of thought.

5. The communication apparatus of claim 4, further including:
  audio producing means capable of reproducing pronunciations of said target language corresponding to said graphic symbols and said target language text contained in said individual cells of said geometric configuration when said cell is pressed.

6. The communication apparatus of claim 5, wherein said audio producing means are pressure sensitive memory chips containing circuits capable of producing audio, said pressure sensitive memory chips coupled to each said individual cell and activated when said cell is pressed.

7. The communication apparatus of claim 3, wherein said interrogative phrases include the phrase "how much?", and a last row of said geometric configuration includes a first plurality of numerals readily identifiable in said native language and a second plurality of numerals, corresponding to said first plurality of numerals, readily identifiable in said target language, wherein said last row of said geometric configuration is adjacent to native language text and foreign language text for said interrogative phrase "how much?", whereby said first user and said second user can communicate about sums and quantities relating to objects that have been referenced.

8. The communication apparatus of claim 7, further including terms of etiquette commonly used in said native language and corresponding translations in said target language, whereby said first user who initiates a conversation with a second user can politely begin and end said conversation by referencing said terms of etiquette.

9. The communication apparatus of claim 8, further including phonetic spellings of said target language text in said native language in order that said target language text may be correctly pronounced when referenced.

10. The communication apparatus of claim 3, wherein said plurality of graphic symbols, said native language text and said target language text are disposed on an article of clothing, wherein said native language text is readable from a perspective of a first user wearing said article, and said plurality of graphic symbols and said target language text are readable from a perspective of a second user facing said article.

11. The communication apparatus of claim 3, wherein said plurality of graphic symbols, said native language text and said target language text are disposed on a common object which is carried, wherein said native language text is readable from a perspective of a first user carrying said object, and said plurality of graphic symbols and said target language text are readable from a perspective of a second user facing said object.

12. The communication apparatus of claim 3, wherein at least one of said graphic symbols includes descriptive text in said native language and descriptive text in said target language to augment identification of said objects being depicted.

13. A communication apparatus for enabling a first user who speaks a native language to communicate with a second user who speaks a target language, said communication apparatus positioned on a common surface of an article which can be transported by at least one of said users in combination therewith, said communication apparatus comprising:
  a plurality of graphic symbols depicting objects readily identifiable in said native language and said target language disposed on said common surface;
  native language text corresponding to phrases commonly used in conjunction with said objects in said native language disposed on said common surface;
  at least one target language text corresponding to a translation of said native language text into said target language, wherein said plurality of graphic symbols, said native language text and said target language text are disposed in a proximate relationship on said common surface, wherein said plurality of graphics symbols, said native language text and said target language text are of a raised texture so as to be understandable to a blind user, whereby said first person who speaks a native language and said second person who speaks a target language can communicate by sequentially referencing said native language text, said target language text and said graphic symbols to form a complete expression of thought.

14. A communication apparatus for enabling a first user who speaks a native language to communicate with a second user who speaks a target language, said communication apparatus positioned on a common surface of an article which can be transported by at least one of said users in combination therewith, said communication apparatus comprising:
  a plurality of graphic symbols depicting objects readily identifiable in said native language and said target language disposed on said common surface;
  native language text corresponding to phrases commonly used in conjunction with said objects in said native language disposed on said common surface;
  at least one target language text corresponding to a translation of said native language text into said target language, wherein said plurality of graphic symbols, said native language text and said target language text are disposed in a proximate relationship on said common surface, wherein said plurality of graphic symbols, said native language text and said target language text are disposed upon a transportable article selected from the group consisting of T-shirt, sweatshirt, backpack, totebag, cup and umbrella, whereby said first person who speaks a native language and said second person who speaks a target language can communicate by sequentially referencing said native language text, said target language text and said graphic symbols to form a complete expression of thought wherein said native language text is readable from a perspective of a first user carrying said article and said plurality of graphic symbols and said target language text are readable from a perspective of a second user facing said article.

15. A method for enabling a first user who speaks a native language to communicate with a second user who speaks a target language, comprising the steps of:
  forming individual areas on a common surface into a plurality of cells;
  arranging said plurality of cells into a geometric configuration consisting of horizontal rows from a first row to a last row and vertical columns from a first column to a last column;
  printing native language text consisting of commonly used interrogative and imperative phrases and corresponding target language translations of said native language text inside cells contained in said first column of said geometric configuration;
  placing graphic symbols, corresponding to said interrogative and said imperative phrases, in cells contained in a second through said last column of said geometric configuration, whereby said first user communicates to said second user by alternately pointing to cells in said first column containing said interrogative and imperative phrases and to cells containing said graphic symbols in order to complete said interrogative phrases and said imperative phrases and communicate a complete expression of thought.

16. The method of claim 15, wherein said common surface includes corresponding phonetic spellings of text in said target language and further comprising the step of:

pronouncing one of said phonetic spellings while simultaneously pointing to said text in said native language and said graphic symbols in order to enhance understanding by said second user.

17. The method of claim 15, wherein said common surface includes a first plurality of numerals readily identifiable in said native language and a corresponding second plurality of numerals readily identifiable in said target language, and further comprising the step of:

selectively choosing numerals in said native language in order to indicate quantities and sums pertaining to said objects which have been referenced.

* * * * *